United States Patent [19]

Wirth

[11] Patent Number: 5,052,277
[45] Date of Patent: Oct. 1, 1991

[54] HYDRAULIC CYLINDER FOR BRAKING ELEMENTS OF VEHICLES

[75] Inventor: Xaver Wirth, Ismaning, Fed. Rep. of Germany

[73] Assignee: Knorr-Bremse AG, Munich, Fed. Rep. of Germany

[21] Appl. No.: 554,351

[22] Filed: Jul. 19, 1990

[30] Foreign Application Priority Data

Jul. 19, 1989 [DE] Fed. Rep. of Germany ....... 3923943

[51] Int. Cl.$^5$ .............................................. F01B 31/00
[52] U.S. Cl. ......................................... 92/110; 92/13; 92/13.6; 92/24; 92/27; 92/28; 92/107; 92/108
[58] Field of Search ................... 92/13, 13.624, 27, 28, 92/107, 108, 110; 188/196 P, 196 A, 351, 71.8

[56] References Cited

U.S. PATENT DOCUMENTS

| | | | |
|---|---|---|---|
| 2,571,963 | 10/1951 | Stelzer | 188/351 |
| 3,470,793 | 10/1969 | Hanchen | 92/24 X |
| 3,643,763 | 2/1972 | Hay | 188/196 A X |
| 4,068,746 | 1/1978 | Munechika | 188/196 A |

FOREIGN PATENT DOCUMENTS 383906 9/1973 U.S.S.R. .................................. 92/27

Primary Examiner—Edward K. Look
Assistant Examiner—Todd Matingly
Attorney, Agent, or Firm—Pollock, Vande Sande & Priddy

[57] ABSTRACT

In an hydraulic cylinder for vehicle braking elements, a clamping piston (1) moved in a housing (3) by hydraulic pressure acts relative to a brake lining carrier bearing a brake lining, e.g., in the form of a brake shoe which, during braking, is forced against the brake disk. To prevent the clamping piston (1) in rest position from being pushed back into its housing (3) by axial impact forces, the clamping piston (1) can be coupled at its interior to an hydraulic volume, which, in the neutral position of the clamping piston (1), acts as an hydraulic cushion and counteracts the impact forces. The hydraulic cushion is formed by an auxiliary piston (17) which defines an hydraulic volume at the interior of clamping piston (1) and which, with the clamping piston in rest position, sealingly abuts the clamping piston and locks the hydraulic volume relative to the pressure chamber (11) of the clamping piston (1), but when the clamping piston (1) is pressurized, produces an unobstructed connection between the pressure chamber (11) and the hydraulic volume within the auxiliary piston (17).

4 Claims, 1 Drawing Sheet

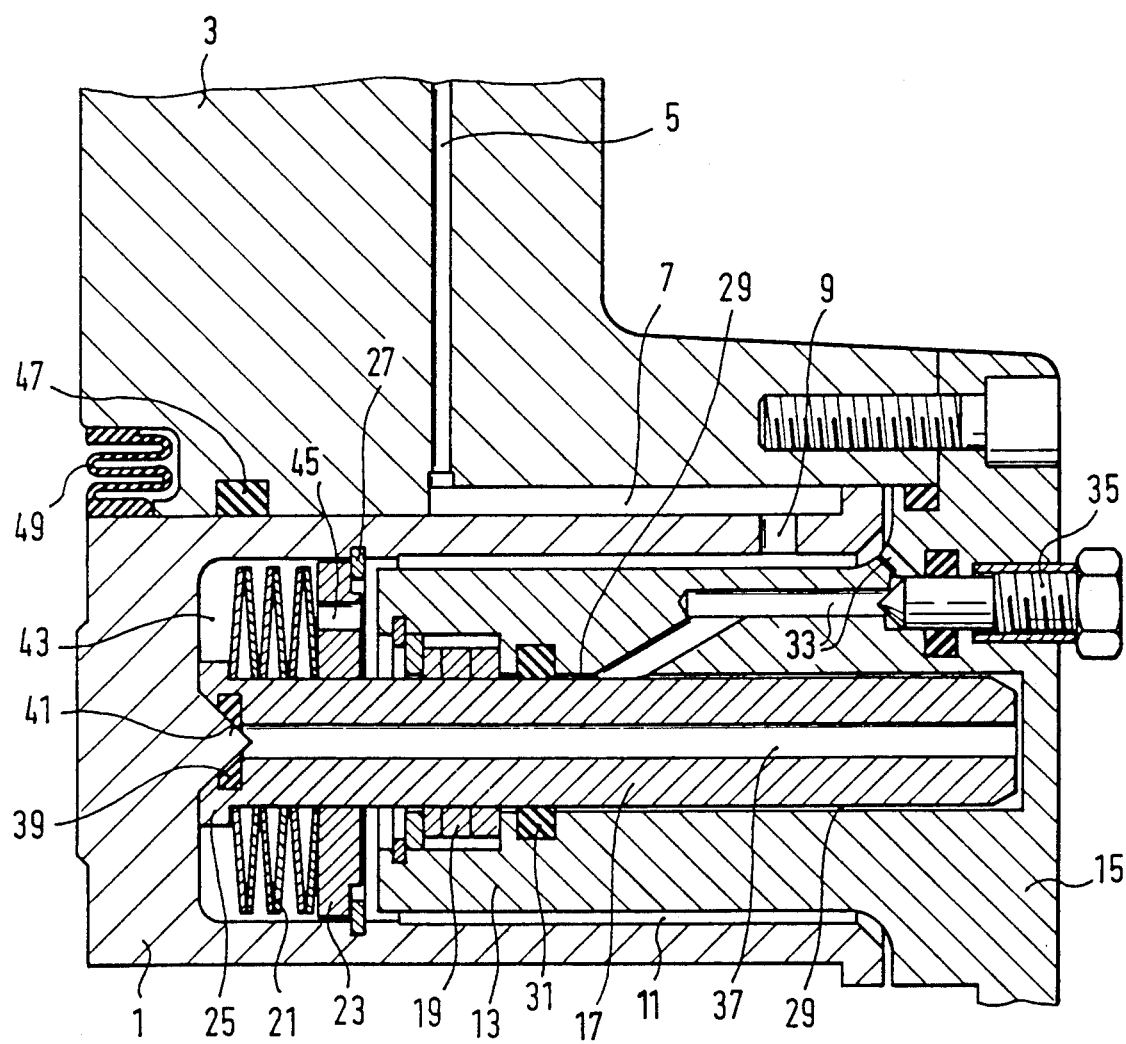

HYDRAULIC CYLINDER FOR BRAKING ELEMENTS OF VEHICLES

FIELD OF THE INVENTION

The invention relates to an hydraulic cylinder for braking elements of vehicles.

BACKGROUND OF THE INVENTION

Brake systems that can be actuated by a pressure medium, e.g., disk brake systems for rail and commercial vehicles, exhibit in their design as caliper constructions a piston that is guided pressure-tight in a housing or in the caliper construction and can be actuated by an hydraulic medium and that, when actuated, act relative to a brake shoe bearing a brake lining, in order to force said brake shoe with its brake lining against a brake disk to be braked. Hydraulic cylinders operating in this manner can also be used in so-called caliper constructions, preferably for rail vehicles, in order to force the arms of a caliper on both sides against a brake disk to be braked.

Actively acting clamping pistons of such brake actuating elements can be subjected in the inactive state, i.e., in the position of rest, to axially directed impact forces, which can lead to the clamping pistons beings pushed back into the housing accommodating them. This unintentional pushing back is a drawback, since it results in an increase in the leading stroke, in the final analysis a longer braking distance.

To overcome this problem, it is possible to guide the clamping piston by means of a clamping spring frictional force relative to the housing accommodating said clamping piston. However, this solution has the drawback that the clamping spring frictional force has a negative effect on the hysteresis. For floating caliper designs with great mass and relatively high lateral movements of the brake disk, this frictional force would have to be unacceptably high.

SUMMARY OF THE INVENTION

Starting at this point, the object of the invention is to design an hydraulic cylinder for brake elements of vehicles in such a manner that unintentional pushing back of the clamping piston into the housing accommodating it can be avoided by means of a simply designed non-return lock. In particular, the object is to avoid having to overcome additional frictional forces between clamping piston and stationary housing.

The means to prevent the unintentional insertion of the clamping piston owing to axially directed impact forces are of a very simple nature, since the hydraulic medium that is normally used as the pressure medium is also used to couple an hydraulic volume, which counteracts the axially directed impact forces acting from the outside on the clamping piston, to the clamping piston when it is in a position of rest. In particular, no additional forces between clamping piston and housing need be overcome in order to prevent the undesired inward movements of the clamping piston, i.e., the risk of hysteresis is ruled out.

Even though the hydraulic volume is normally active when the clamping piston in a position of rest, it can be readily connected through a release in pressure, i.e., by opening the sealing screw, to the actual working volume in the pressure chamber of the hydraulic cylinder in order to exchange the brake linings at the brake lining carrier(s) when the clamping piston is being actively pushed back.

BRIEF DESCRIPTION OF THE DRAWING

The invention is explained by way of an embodiment thereof shown in the single FIGURE of the accompanying drawing, which is a partial cross-sectional view of the hydraulic cylinder according to the invention.

DESCRIPTION OF PREFERRED EMBODIMENT

The drawing shows an hydraulic cylinder with a clamping piston 1, which can be moved axially in a housing 3. Housing 3 is, e.g., a component of a floating caliper or a brake caliper arrangement. Clamping piston 1 can be hydraulically actuated, with the hydraulic working medium flowing through bore 5 into ring chamber 7, from said ring chamber into bore 9 and into pressure chamber 11, and said hydraulic working medium may act on clamping piston 1 in the sense of a working stroke directed to the left according to the drawing. When actuated, the clamping piston acts on the brake lining carrier (not illustrated), which can be forced, e.g., against a brake disk.

Clamping piston 1 is designed substantially as a hollow cylinder and comprises in its interior an axial extension 13 of a cover 15 screwed to housing 3, with an auxiliary piston 17, which extends axially, being guided in the extension. A clamping spring 19, which is located on the inner circumference of extension 13 and which may be a grid-spring, abuts, subject to frictional locking, against the outer circumference of auxiliary piston 17. On the left end, as seen in the drawing, several disk springs 21 are guided as a set of springs on the outer circumference of auxiliary piston 17. Clamping piston 1 guided in housing 3 is prestressed axially with the aid of disk springs 21 and disk 23 bracing on the right side the disk springs, since the disk springs are braced on their left end with respect to a collar 25 of auxiliary piston 17 and disk 23 is held axially by a retaining ring 27. Auxiliary piston 17 is hollow in its interior, i.e., it comprises on the right a free connection to chamber 29, which is formed between auxiliary piston 17 and extension 13 and which is sealed by a seal 31 with respect to clamping spring 19. Chamber 29 can be connected by means of a channel 33 to the annular pressure chamber 11 surrounding extension 13, when a sealing screw 35 extending into channel 33 is screwed back into opened position from the locked position shown in the drawing.

Bore 37 extending axially into the interior of auxiliary piston 17 is surrounded on its end shown on the left in the drawing by a seal 39, wherein in the illustrated position of auxiliary piston 17 seal 39 abuts sealingly a cone 41, which extends as one piece from clamping piston 1 towards the right. If auxiliary piston 17 is raised from the illustrated sealing position relative to clamping piston 1 from said clamping piston, then the result is a free connection between the interior of the auxiliary piston and chamber 43 accommodating disk springs 21. Chamber 43 communicates freely with pressure chamber 11; thus it is a component of said pressure chamber. Preferably disk 23 is penetrated at least by one axial bore 45 in order to enable a free exchange of the hydraulic working medium between chamber 43 and pressure chamber 11.

In the illustrated embodiment, clamping piston 1 is sealed relative to the inner wall of housing 3 by means of a seal 47, with bellows 49 preventing the dirt particles from penetrating into the ring slot between clamping piston 1 and housing 3.

The hydraulically operated piston non-return lock described above operates as follows:

To actuate the brake (not illustrated) with the aid of the hydraulic cylinder, hydraulic working medium is fed with predetermined pressure into bore 5. Following application of hydraulic operating pressure P1, the clamping piston 1 travels out until the clamping force at the brake lining (not illustrated) is built up. When clamping piston 1 is extended, said clamping piston moves relative to auxiliary piston 17, since the latter is friction-locked with respect to extension 13 of cover 15 by means of clamping spring 19. Consequently the disk springs 21 between collar 25 and retaining ring 27 or disk 23 are prestressed. Cone 41 is lifted from seal 39 so that there is a free connection between the interior of the auxiliary piston, chamber 43 and pressure chamber 11. If the piston path travelled by clamping piston 1 is less than the available excursion of the disk springs, clamping spring 19 friction-locks the auxiliary piston with respect to the housing. As explained above, in this piston position, cone 41 is raised from direction 39, i.e., all inner chambers of the system are thus under operating pressure p1.

If the operating pressure is reduced, thus approaching the value 0, clamping piston 1 is pushed in again in accordance with the excursion of the disk springs. The contact surface in the region between cone 41 and seal 39 is closed again.

If, however, the travel path of clamping piston 1 is greater than the greatest possible spring excursion of disk springs 21, auxiliary piston 17 is pulled out of extension 13 securely attached to the housing, subject to the effect of the hydraulic piston force, after overcoming the frictional force of clamping spring 19. If the brake is released, the operating pressure thus being reduced again, the clamping piston travels in at this stage in accordance with the spring excursion of the disk spring; thus the clamping piston has pursued. Even after this return stroke, the sealing or contact surface between cone 41 and seal 39 is closed again.

When the sealing or contact surface between cone 41 and seal 39 is closed, bore 37, chamber 29 and channel 33 are locked with respect to pressure chamber 11 and bore 5. Even if the impact force is greater than the clamping spring frictional force, the impact force aimed externally at the face of the clamping piston does not result in the clamping piston being "driven" into housing 3, since the fluid volume cannot flow behind seal 39 and thus acts as a pressure cushion. Thus, there is an hydraulic non-return lock of the clamping piston.

To replace the lining, the clamping piston has to be pushed back from the face side by means of a tool (lever, screw clamp, etc.). To this end, the sealing screw 35, which is normally in closed position, is unscrewed, i.e., opened. The hydraulic volume preventing the return of the clamping piston can consequently flow back unimpeded through channel 33 and bore 5 into the hydraulic tank. After the successful replacement of the brake lining(s) of the brake element that can be actuated by the clamping piston, the sealing screw 35 is closed again, i.e., the non-return lock is re-activated.

What is claimed is:

1. Hydraulic cylinder for vehicle brakes, comprising a clamping piston (1) hydraulically driven in a cylinder housing (3) and, when actuated, acting relative to a brake lining carrier having a brake lining, an adjusting device being associated with said clamping piston and a non-return lock preventing said clamping piston from being driven in by axially directed impact forces, wherein
   (a) in a neutral position of said clamping piston (1) an hydraulic volume, which absorbs the impact forces acting on clamping piston (1), is coupled to said clamping piston (1);
   (b) said clamping piston (1) comprises an axially extending interior recess closed toward a front of said clamping piston and open at a rear of said clamping piston, an extension (13) securely attached to the housing projecting into a rearward opening of said recess;
   (c) an axial chamber (29) within said extension (13) in which chamber an auxiliary piston (17) is guided, said auxiliary piston (17) being friction-locked on its outer circumference by a clamping spring (19) used on an inner circumference of said chamber (29);
   (d) said auxiliary piston (17) having a continuous, axial bore (37) open on both sides of said auxiliary piston with an end of said auxiliary piston (17) directed toward said front of said clamping piston (1) carrying a seal (39) which surrounds said axial bore (37) and in neutral position of said clamping piston (1) sealingly abuts a sealing seat of said clamping piston in such a manner that said bore (37) of said auxiliary piston (17) is sealed with respect to the frontal inner end of said clamping piston;
   (e) said bore (37) communicates freely at said rear of said auxiliary piston (17) with said chamber (29);
   (f) said clamping piston (1) is resiliently prestressed with respect to said auxiliary piston (17) by disk spring means (21), in such a manner that, when hydraulically operated, said clamping piston is driven out of said cylinder housing (3) in accordance with an excursion of said disk spring means (21) until, in the event of an additional actuating path, said auxiliary piston (17) is carried along by said disk spring means (21) against frictional locking of said clamping spring (19); and
   (g) said pressure chamber (11) for said clamping piston (1) communicates freely with a chamber (43) housing said disk spring means (21) at a front end of said auxiliary piston, in such a manner that, when said clamping piston is pressurized and said seal (39) is opened, a free connection is established between said pressure chamber (11) and said bore (37) of said auxiliary piston (17).

2. Hydraulic cylinder according to claim 1, wherein said disk spring means (21) is guided on an outer circumference of said auxiliary piston (17) and is braced, on the one hand, by a collar (25) of said auxiliary piston and, on the other hand, by a retaining ring (27) on an inner circumference of said pressure chamber (11).

3. Hydraulic cylinder according to claim 1, wherein said chamber (29) surrounding said auxiliary piston (17) within said extension (13) can be connected to said pressure chamber (11) via a-channel (33) and a sealing screw (35) adapted to be screwed between open and closed positions in such a manner that the hydraulic volume located in said chamber (2) and said bore (37) and forming said non-return lock can be relieved for the purpose of replacing said brake lining.

4. Hydraulic cylinder according to claim 3, wherein said sealing screw (35) can be screwed between open and closed position with respect to a cross-section of said channel (33).

* * * * *